United States Patent [19]
Ralph

[11] Patent Number: 5,513,821
[45] Date of Patent: May 7, 1996

[54] AIRCRAFT STEERING SYSTEM AND METHOD FOR LARGE AIRCRAFT HAVING MAIN LANDING GEAR STEERING DURING LOW TAXI SPEED WHILE NOSE GEAR IS CASTORED

[75] Inventor: Harry C. Ralph, Kirkland, Wash.

[73] Assignee: The Boeing Company, Seattle, Wash.

[21] Appl. No.: 219,329

[22] Filed: Mar. 29, 1994

[51] Int. Cl.⁶ .......................... B64C 25/50; B64C 25/42
[52] U.S. Cl. ........................ 244/50; 244/103 W; 180/143
[58] Field of Search ................... 244/50, 100 R, 244/102 R, 103 R, 103 W; 180/140, 141, 143

[56] References Cited

U.S. PATENT DOCUMENTS

| | | | |
|---|---|---|---|
| 1,503,297 | 7/1924 | Calagans | 244/103 W |
| 2,254,935 | 9/1941 | Darling. | |
| 2,474,630 | 6/1949 | Jamison | 244/50 |
| 2,614,775 | 10/1952 | Koester et al. | 244/50 |
| 2,621,002 | 12/1952 | Pittman. | |
| 2,734,589 | 2/1956 | Groen. | |
| 2,756,949 | 7/1956 | Smith. | |
| 2,906,474 | 9/1959 | Cravero. | |
| 2,943,819 | 7/1960 | Orloff et al. | 244/50 |
| 2,943,820 | 7/1960 | Westcott, Jr. | 244/50 |
| 2,953,323 | 9/1960 | Minch. | |
| 3,007,655 | 11/1961 | Criswell et al. | |
| 3,067,832 | 12/1962 | Wohl. | |
| 3,338,328 | 8/1967 | Cataldo | 244/50 |
| 3,488,020 | 1/1970 | Scherer. | |
| 3,516,625 | 6/1990 | Houser | 244/50 |
| 3,586,117 | 6/1971 | Tourneau | 244/50 |
| 3,807,664 | 4/1974 | Kelly, Jr. et al. | 244/50 |
| 3,823,899 | 7/1974 | Currey | 244/103 W |
| 3,885,759 | 5/1975 | Lear | 244/50 |
| 5,242,131 | 9/1993 | Watts | 244/103 W |

*Primary Examiner*—Andres Kashnikow
*Assistant Examiner*—Virna Lissi Mojica
*Attorney, Agent, or Firm*—Conrad O. Gardner

[57] ABSTRACT

A steering method and system for large aircraft wherein during low speed taxi the main landing gear wheels are steered and the nose gear is free to castor. During high speed taxi such as during take off and landing, the main gear steering is locked out while the nose gear is steered.

3 Claims, 3 Drawing Sheets

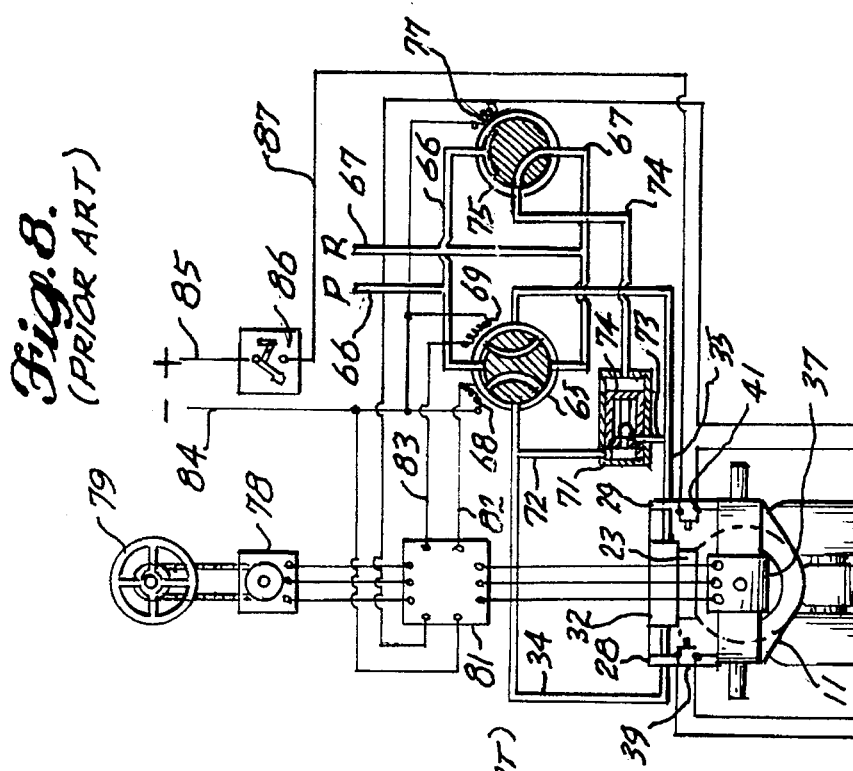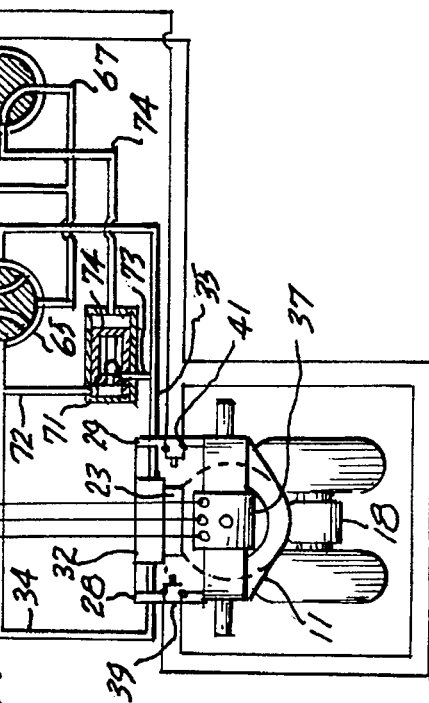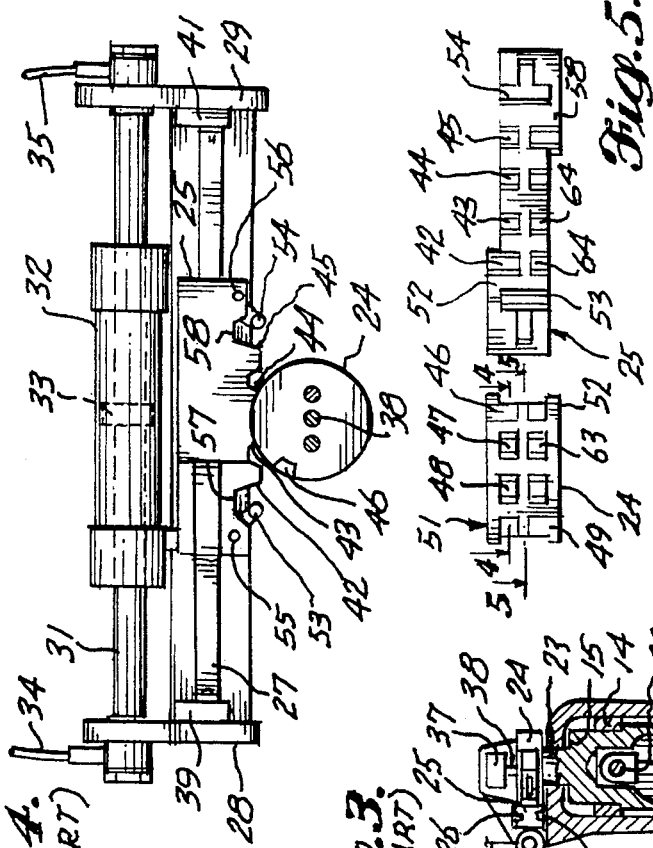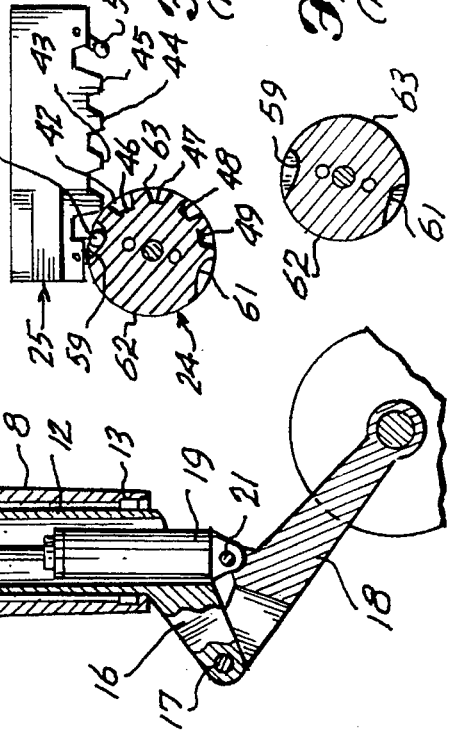

AIRCRAFT STEERING SYSTEM AND METHOD FOR LARGE AIRCRAFT HAVING MAIN LANDING GEAR STEERING DURING LOW TAXI SPEED WHILE NOSE GEAR IS CASTORED

BACKGROUND OF THE INVENTION

1. Field of the Invention

The present invention relates to aircraft steering systems and more particularly to a method and system for steering large aircraft.

2. Description of the Prior Art

In the patent literature, U.S. Pat. No. 3,488,020 to Scherer assigned to The Boeing Company is illustrative of an aircraft steering system comprising a steerable nose gear and having at least one main wheel truck which rotates opposite the nose gear when the aircraft is negotiating a tight turn radius. In contrast the present invention utilizes steerable nose and main gear in which each is utilized separately to control the aircraft, the nose gear for high speed taxing and main gear for low speed taxing.

U.S. Pat. No. 2,254,935 relates to rack and pinion steering.

U.S. Pat. No. 3,007,655 shows electrical actuation steering.

U.S. Pat. No. 2,621,002 shows main post steering of a gear.

U.S. Pat. No. 2,734,589 shows speed response control.

U.S. Pat. No. 2,756,949 is illustrative a swiveling gear.

U.S. Pat. No. 2,906,474 is illustrative of speed responsive control; and

U.S. Pat. No. 3,067,832 relates to velocity modulation.

What will become understood and appreciated hereinafter is that the more efficient the "steering device" is, the more control the main gears have over the more gear in the turning of the aircraft. In fact the ultimate solution would be realized if the "steering device" efficiency were 100%, then the nose gear steering torque requirements would be zero. The nose gear would need to be "fully castoring" as all the steering torque would be generated by the main gears. However, due to the power the main gears would have over the nose in turning the aircraft, the sensitivity of the overall steering of the aircraft may be a problem. As a consequence it is advisable to retain the nose gear steering as a controller (with the main gears following as in Boeing type 747 aircraft) up to the maximum required nose steering angle.

SUMMARY OF THE INVENTION

A steering system for large aircraft (weighing over 650,000 pounds) wherein during low speed taxi when aircraft taxi speed falls below a predetermined level (e.g., below a maximum speed of 60 knots) the main landing gear wheels are steered and the nose gear automatically disengages (castors). However, if nose gear steering is required for over steering sensitivity, the nose gear may be reactivated. During high speed taxi (speed above the predetermined level) such as during take-off and landing the main gear is locked out, while the nose gear is steered. During low speed taxi when all wheels of the main gears are programmed to "track" circles around the aircraft to steering center, the main landing gear will command the directional control of the aircraft, and the nose gear allowed to "free castor" possibly beyond its powered steering range.

BRIEF DESCRIPTION OF THE DRAWINGS

FIGS. 3, 4, 5, 6, 7, and 8 correspond to FIGS. 1, 2, 3, 4, 5, and 6 of British Patent No. 879,276.

DETAILED DESCRIPTION

PROBLEM

The majority of aircraft are steered by means of changing the angle of the nose wheel with respect to a "straight ahead" position.

Having selected an angle of nose gear steering, the main landing gears follow the direction of the aircraft with a variable amount of "scrubbing" between the main gear tires and the ground.

As the nose gear steering angle increases, so does the "scrubbing" of the main gear tires. At a certain point, this "scrubbing" (or the adhesion of the main gear tires to the ground) overcomes the adhesion of the nose gear tires to the ground, and the nose gear loses its command of the aircraft's directional control.

If any of the main gear tires do not "track" a circle around a common turning center, the aircraft will not be controllably steered.

SOLUTION

In accordance with a preferred embodiment of the present aircraft steering system for large aircraft, main gear tire/ground adhesion controls the aircraft direction during slow speed taxing and maneuvering and nose gear tire/ground adhesion controls the aircraft direction during high speed taxi, take off and landing modes. The "single wheel steering system" described in applicants patent application Ser. No. 08/214,483 filed Mar. 17, 1994, titled MAIN LANDING GEAR HAVING INDEPENDENT STEERING OF EACH AXLE ON MULTIPLE AXLE TRUCKS, the details of which are incorporated herein by reference proved the main landing gear 22 of FIG. 2. Single wheel steering as described therein is preferred due to the ability of that system to optimize "scrubbing" due to the precise positioning of each individual wheel, and the minimizing of steering actuator size.

Figure 1:
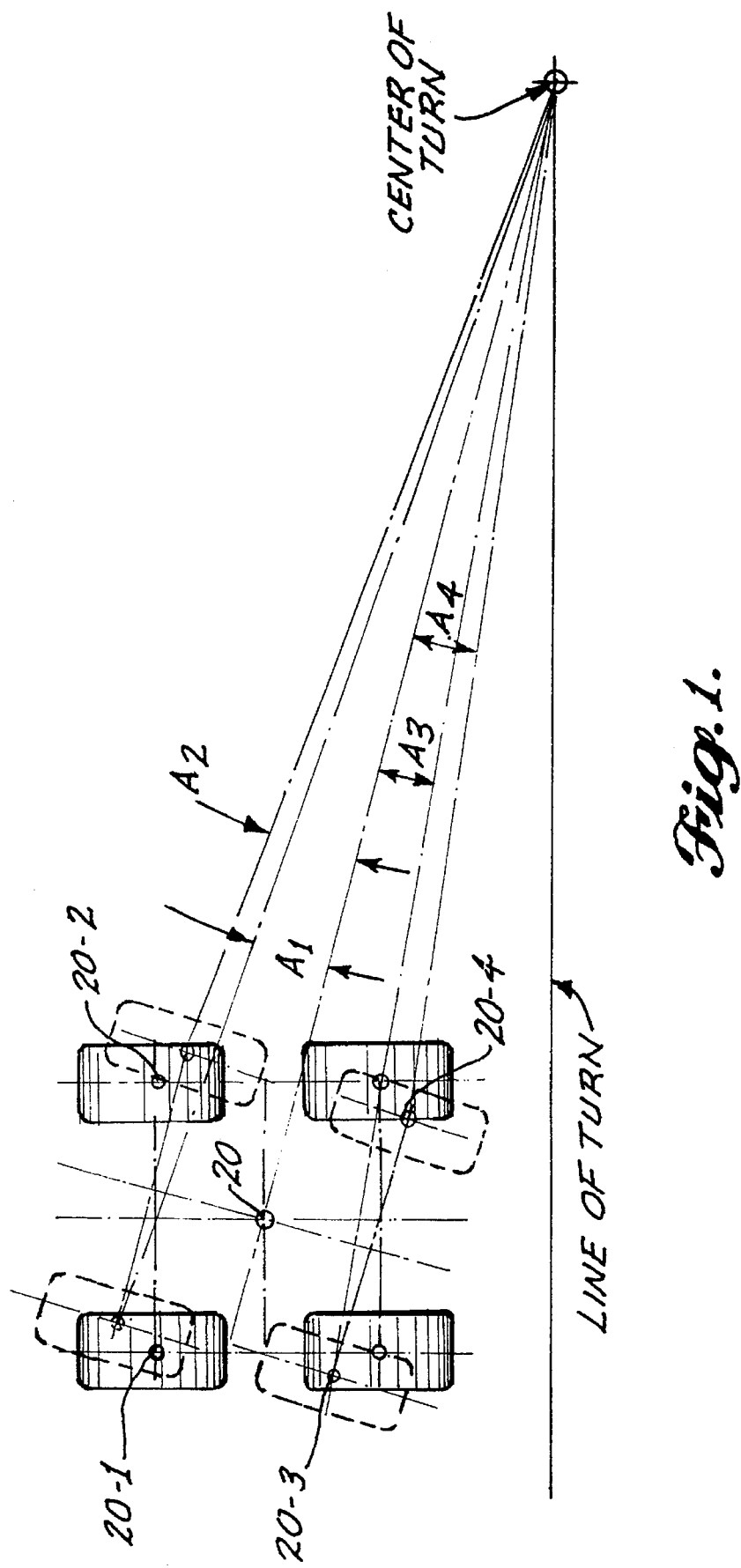
FIG. 1 is illustrative of an approximate assessment of the main gear steering required for a given large aircraft maneuver; and, FIG. 2 is a diagram illustrative of the angular relationship between nose and main landing gear wheels in accordance with a preferred embodiment of the present method and system for achieving a desired 180 degrees turn on a 150 foot runway with a large aircraft.
Figure 2:
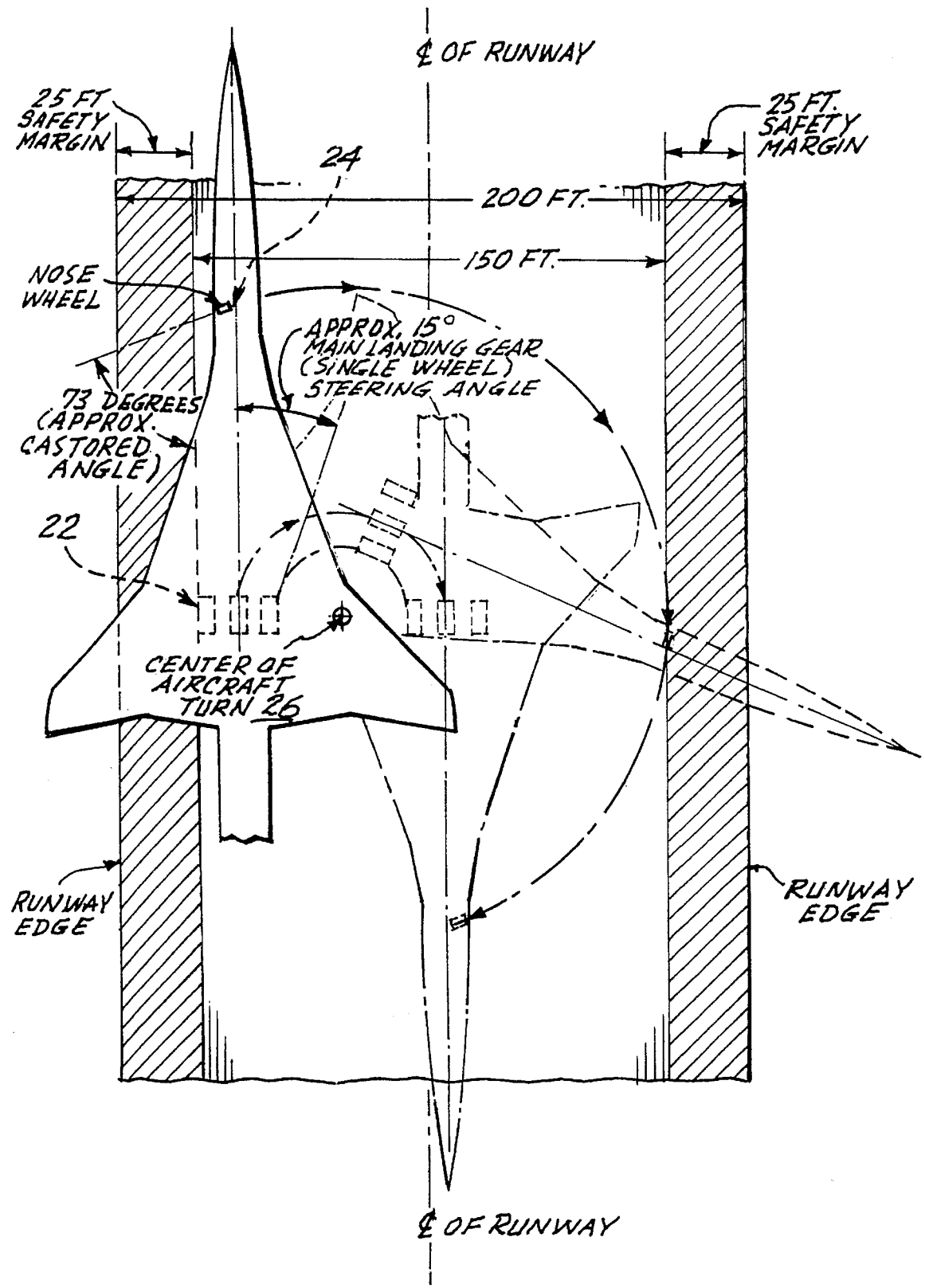

Nose gear steering 24 of FIG. 2 is rack and pinion type steering as shown in FIGS. 3 through 8. The rack and pinion steering of FIGS. 3 through 8 corresponds to the device shown in FIGS. 1 through 6 of British Patent No. 879,276, the detailed description thereof being incorporated herein by reference. Rack and pinion nose gear steering provides constant torque output which is a distinct advantage especially for large angles where maximum steering power is usually required. The size of the steering angle is most often decided by the allowable length of rack, therefore, in the present system, the required steering angle is only ±20 Degrees, the rack will be exceptionally small. The rack and pinion steering utilized herein allows the nose gear to castor in excess of the powered steering range, and without the need for a manual disconnect. Re-engagement is also automatic, and the correct rack to pinion relationship is maintained at all times.

The nose landing gear powered steering angle may be limited to e.g., ±20 Degrees, and the castoring angle may be from ±20 to ±90 Degrees, as this appears necessary to ensure stability of the aircraft on the runway during take-off and landing, and any other high speed taxi requirements. Under these circumstances, the main gear steering is mechanically locked out of the system.

As the aircraft taxi speed falls below a pre-determined level (e.g., 60 knots maximum) and into the low speed taxi mode, the main landing gear 22 steering is automatically unlocked and the nose gear steering automatically disengages (castors). The nose gear may be continually used up to its maximum steering angle, if overall steering sensitivity is a requirement. Provided all wheels of the main gears 22 are programmed to "track" circles around the aircraft's' steering center 26 of FIG. 2 main landing gear 22, will command the directional control of the aircraft.

Further, in the present aircraft steering system, overlapping of main and nose gear steering angles is possible as required. All wheels which accurately "track" a circular path will develop some scrubbing, however, the torque due to tire adhesion will be small. Over steering in order to compensate for this can be incorporated into the present system (proportionately for each individual wheel).

The resistance of an aircraft to turn is inversely proportional to the efficiency of the main gear steering. As this efficiency increases, frictional torque up the gear post decreases and so the fatigue life of the gears is enhanced.

An approximate assessment of the degree of main gear steering required (for a given airplane maneuver), is illustrated in FIG. 1 shown in steady state, with an allowance made for dynamic conditions.

The 747 Boeing type body gear steering system as shown in aforementioned U.S. Pat. No. 3,488,020 reduces the "reluctance to turn" of an airplane. It does this by rotating the truck and its fore and aft C/L from its original straight ahead position to a line (normal to that C/L) which intersects the center of turn (Ref. point 50 of FIGS. 1 in U.S. Pat. No. 3,488,020). Although the truck C/L is efficiently steered, the wheel axles are not. Each wheel has its own angular "error", which when summed for the total number of tires (16 in this case) can be shown to represent the total reluctance of the airplane to turn. This statement is true, given the following assumptions:

(a) Common turning maneuver. e.g.; Steady state 180 degree turn (on a 162 ft. turning distance)

(b) Common wheel loading. e.g.; 50,000 lb. (±2500 lb.)

(c) Common tire pressure.

(d) All bias, or all radial tires operating on identical runway conditions.

Reluctance to turn (for landing gear located at point 20).

$$R=(A1+A2+A3+A4)$$

Similarly for gear at point 18; R=(B1+B2+B3+B4).

Similarly for gear at point 19; R=(C1+C2+C3+C4).

Similarly for gear at point 20; R=(D1+D2+D3+D4). i.e.; Reluctance to turn (for the whole aircraft)=R(total)= R+R+R+R The total reluctance to turning for a Boeing type 747-400 for the maneuvers quoted, include the following angular deficiencies:

Without main gear steering; 169.58 degrees

With main gear steering: 45.36 degrees

This shows a large decrease in the reluctance to turn, but it is far from the main gear steering required to justify main steering control, i.e., steering is still controlled by the nose gear.

King pin steering as shown in the above referenced application filed Mar. 17, 1994, provided the ability to reduce R (total) to zero hereby enabling the complete control of the aircraft maneuverablity by the main gears.

As hereinafter stated, sensitivity of the movement of the aircraft could become a problem in which case, the nose gear steering control maintained up to the maximum nose steering angle range, and then automatically switched to main gear control as appropriate.

What is claimed is:

1. The method of steering a large aircraft having main landing gear, wherein said main gear includes a main gear steering system and said main gear steering system includes a means to lock and unlock the main gear steering system wheels and nose gear, wherein said nose wheel includes a nose wheel steering system and said nose wheel steering system includes a means to engage and disengage the steering system for low speed taxi and high speed taxi including the steps of:

steering the main landing gear wheels and castoring the nose gear during low speed taxi; and, locking out the main gear and steering the nose gear during high speed taxi.

2. In an aircraft having:

a nose wheel steering system, wherein said nose wheel steering system includes a means to engage and disengage the nose wheel steering system; and a main gear steering system, wherein said main gear steering system includes a means to lock and unlock the main gear steering system for providing main landing gear steering;

the method of unlocking said main landing gear steering, and disengaging said nose wheel steering system when the aircraft taxi speed falls below a predetermined maximum taxi speed.

3. The method according to claim 2 wherein said predetermined maximum speed is about 60 knots.

* * * * *